United States Patent
Legros et al.

(10) Patent No.: US 7,834,509 B2
(45) Date of Patent: Nov. 16, 2010

(54) ROTOR ASSEMBLY FOR ELECTROMECHANICAL MACHINE

(75) Inventors: Craig R. Legros, Rockford, IL (US); Laurence D. Vanek, Janesville, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1 day.

(21) Appl. No.: 12/038,998

(22) Filed: Feb. 28, 2008

(65) Prior Publication Data

US 2009/0230804 A1    Sep. 17, 2009

(51) Int. Cl.
*H02K 23/22*    (2006.01)
*H02K 15/02*    (2006.01)
*H02K 1/24*     (2006.01)

(52) U.S. Cl. ............... 310/261.1; 310/267; 310/156.28

(58) Field of Classification Search ............ 310/261.1, 310/156.28, 267; *H02K 23/22, 15/02, 1/24*
See application file for complete search history.

(56) References Cited

U.S. PATENT DOCUMENTS

| 3,679,920 | A | * | 7/1972 | MacNab et al. ............... 310/10 |
| 4,117,360 | A | * | 9/1978 | Richter ........................ 310/183 |
| 4,745,313 | A | * | 5/1988 | Brunet et al. .................. 310/52 |
| 5,168,186 | A | * | 12/1992 | Yashiro ........................ 310/47 |
| 5,323,080 | A | | 6/1994 | Shahamat et al. |
| 5,489,810 | A | | 2/1996 | Ferreira et al. |
| 5,523,635 | A | | 6/1996 | Ferreira et al. |
| 5,696,413 | A | | 12/1997 | Woodbridge et al. |
| 6,011,377 | A | | 1/2000 | Heglund et al. |
| 6,279,966 | B1 | * | 8/2001 | Kondo et al. ................. 285/319 |
| 6,784,585 | B2 | * | 8/2004 | Shah et al. ................... 310/181 |
| 6,992,403 | B1 | | 1/2006 | Raad |
| 7,075,204 | B2 | | 7/2006 | Shiao et al. |
| 7,078,845 | B2 | | 7/2006 | Kaminski et al. |
| 7,146,707 | B2 | | 12/2006 | Tornquist et al. |
| 7,208,854 | B1 | | 4/2007 | Saban et al. |
| 7,272,514 | B2 | | 9/2007 | Qi et al. |
| 7,312,419 | B2 | | 12/2007 | Beeson et al. |
| 7,322,103 | B2 | | 1/2008 | Burjes et al. |
| 2004/0222713 | A1 | * | 11/2004 | Sidey et al. ............ 310/156.43 |
| 2005/0077797 | A1 | * | 4/2005 | Bushko et al. ............... 310/208 |
| 2006/0028935 | A1 | * | 2/2006 | Mori et al. ................. 369/44.37 |
| 2006/0091761 | A1 | * | 5/2006 | Lafontaine et al. .......... 310/261 |
| 2006/0131981 | A1 | * | 6/2006 | Bray et al. ................... 310/216 |
| 2006/0226724 | A1 | * | 10/2006 | Cullen et al. ........... 310/156.28 |

* cited by examiner

*Primary Examiner*—Quyen Leung
*Assistant Examiner*—Terrance Kenerly
(74) *Attorney, Agent, or Firm*—Carlson, Gaskey & Olds PC

(57) ABSTRACT

A rotor assembly for an electromechanical machine includes a rotor core, an outer sleeve and an inner sleeve. The rotor core includes an outer diameter, and the outer sleeve is positioned about the outer diameter. The inner sleeve is positioned between the rotor core and the outer sleeve. One of the outer sleeve and the inner sleeve dampens electromagnetic flux generated by the rotor assembly.

20 Claims, 2 Drawing Sheets

ROTOR ASSEMBLY FOR ELECTROMECHANICAL MACHINE

BACKGROUND OF THE DISCLOSURE

This disclosure generally relates to an electromechanical machine, and more particularly to a rotor assembly for an electromechanical machine.

In aeronautical applications, an electromechanical machine, such as a generator, is often used to supply power to an aircraft, for example. The power produced by the generator is routed and distributed throughout the aircraft via a power generation and distribution system. In some instances, the aircraft may use a single electromechanical machine as both a starter and a generator, such as a dynamoelectric machine, for example.

Electromechanical machines as described above typically include a rotor assembly having a plurality of poles including a plurality of field windings. The field windings generate the electromagnetic flux necessary to induce a magnetic field within a stator assembly of the electromechanical machine. The rotor assembly also includes a damper circuit. For example, the poles each include a plurality of slots that receive a plurality of damper bars. The electromagnetic flux is communicated through the damper bars. A pair of copper end-plates are received at each end of a rotor core of the rotor assembly to electrically connect the damper circuit.

Electromechanical machines having rotor assemblies of this type are heavy and costly to manufacture. Numerous brazing operations are required to fabricate the rotor assembly because each damper bar must be brazed to the copper end-plates to electrically connect the damper circuit.

In addition, the damper bars and the slots the damper bars are received in may create flux pinch points that limit the communication of the electromagnetic flux to the stator assembly. The flux pinch points occur at the location of the damper bars because the electromagnetic flux must "bend" around each of the damper bars. The flux pinch points create increased exciter and main field current flow. The increased exciter and main field current flow necessitates an increase in the size and weight of the electromechanical machine. The increased size and weight of the electromechanical machine negatively impacts aircraft efficiency.

SUMMARY OF THE DISCLOSURE

A rotor assembly for an electromechanical machine includes a rotor core, an outer sleeve and an inner sleeve. The rotor core includes an outer diameter. The outer sleeve is position about the outer diameter of the rotor core. The inner sleeve is positioned between the rotor core and the outer sleeve. One of the outer sleeve and the inner sleeve dampens electromagnetic flux generated by the rotor assembly.

A method of providing a rotor assembly for an electromagnetic machine includes extending a damper circuit about an outer diameter of a rotor core of the rotor assembly. In one example, the damper circuit includes an outer continuous sleeve that surrounds the rotor core.

A rotor assembly for an electromagnetic machine includes a rotor core having an outer diameter, and a composite sleeve that is positioned about the outer diameter. The composite sleeve includes carbon fibers, copper fibers and an epoxy resin.

The various features and advantages of this disclosure will become apparent to those skilled in the art from the following detailed description. The drawings that accompany the detailed description can be briefly described as follows.

DETAILED DESCRIPTION OF THE DISCLOSED EMBODIMENT

Figure 1:
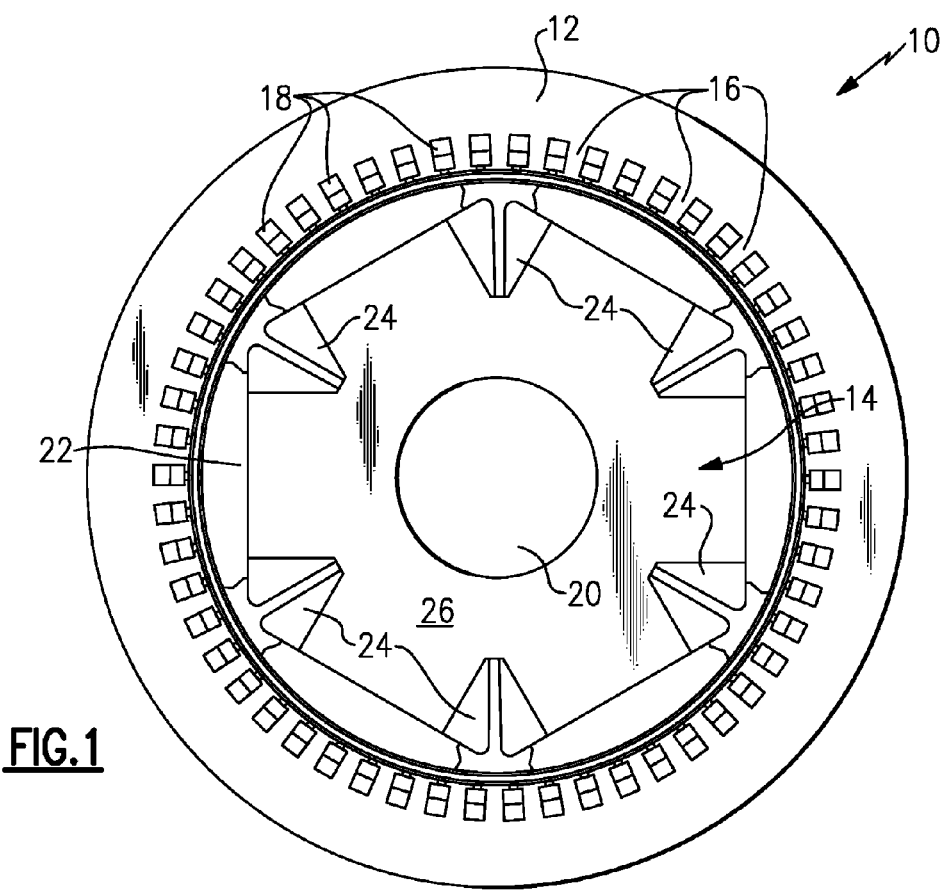
FIG. 1 illustrates an example electromechanical machine.

FIG. 1 illustrates an electromechanical machine 10 that converts mechanical energy to electrical energy. In one example, the electromechanical machine 10 is a generator system for an aircraft. In another example, the electromechanical machine 10 is a starter-generator system for an aircraft. Although the examples and illustrations provided in this disclosure relate to generator systems, it should be understood that the various features and advantages of this disclosure are applicable to any electromechanical machine for any application.

The electromechanical machine 10 includes a stator assembly 12 and a rotor assembly 14 positioned radially inward of the stator assembly 12. The stator assembly 12 includes a plurality of poles 16 having a plurality of stator windings 18 positioned between each of the plurality of poles 16. In one example, the stator windings 18 are wound about each of the plurality of poles 16.

The rotor assembly 14 is rotatably positioned within the stator assembly 12. The rotor assembly 14 includes an opening 20 for receiving a shaft (not shown) of the electromagnetic machine 10. The rotor assembly 14 includes a plurality of poles 22 and a plurality of field windings 24 that are wound about each of the poles 22. The rotor assembly 14 further includes a rotor core 26. In one example, the rotor core 26 includes a plurality of stacked, sheet metal laminations. The actual number of laminations of the rotor core 26 will vary depending upon design specific parameters as would be understood by a person of ordinary skill in the art having the benefit of this disclosure.

In operation, the field windings 24 of the rotor assembly 14 generate an electromagnetic flux. The electromagnetic flux, in turn, induces a magnetic field in the stator windings 18 of the stator assembly 12. The stator windings 18 are connected to various loads of an aircraft, for example, to provide electrical power thereto.

Figure 2:
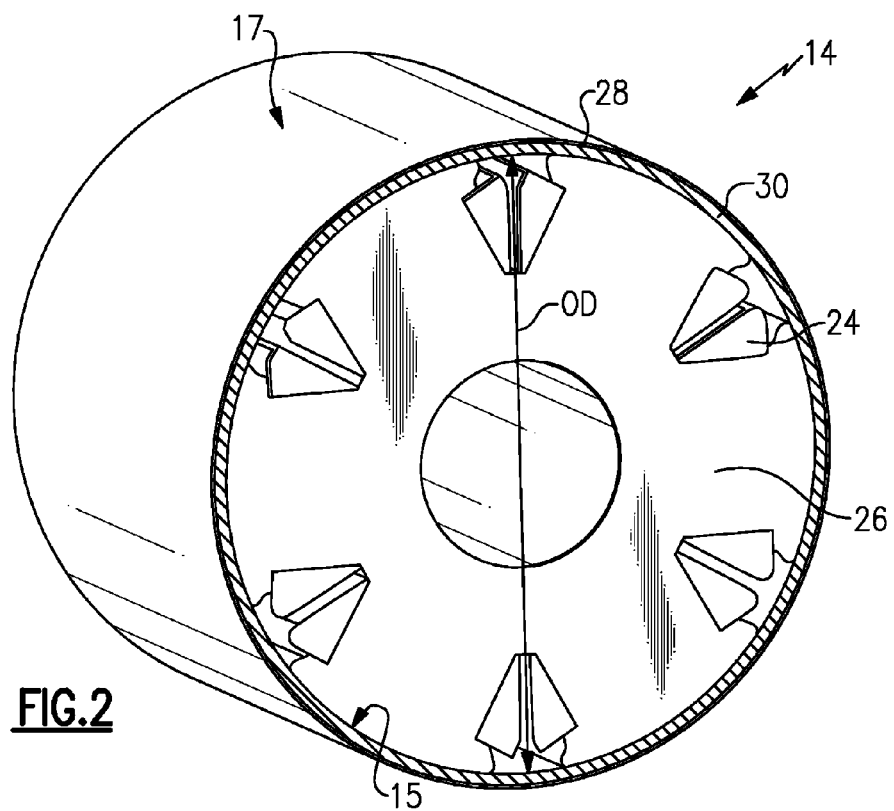
FIG. 2 illustrates an example rotor assembly for use within the electromechanical machine illustrated in FIG. 1.

FIG. 2 illustrates an example rotor assembly 14 for use within the electromechanical machine 10. The rotor core 26 of the rotor assembly 14 defines an outer diameter OD. A radial surface 15 of the rotor core 26 extends about the outer diameter OD. In this example, the rotor assembly 14 includes an outer sleeve 28 and an inner sleeve 30 positioned radially inwardly relative to the outer sleeve 28. Each of the outer sleeve 28 and the inner sleeve 30 extend about the radial surface 15 of the rotor core 26. That is, the outer sleeve 28 and the inner sleeve 30 each radially extend about the outer diameter OD of the rotor core 26.

In this example, the outer sleeve 28 is a damper circuit 17 (i.e., amortisseur circuit) of the rotor assembly 14. That is, the outer sleeve 28 is a continuous conducting damper sleeve that dampens electromagnetic flux that is generated by the rotor assembly 14. The damper circuit 17 is positioned between the rotor assembly 14 and the stator assembly 12.

In one example, the outer sleeve 28 is a copper sleeve and the inner sleeve 30 is a metal sleeve. The inner sleeve 30, in this example, represents an inner structural sleeve. In another example, the inner sleeve 30 is a non-magnetic metallic sleeve. The inner sleeve 30 structurally supports the rotor assembly 14 and, in conjunction with end structures (not shown), contains a fluid, such as oil, within the rotor assembly 14.

The outer sleeve 28 is bonded to the inner sleeve 30. In one example, the outer sleeve 28 is press fit onto the inner sleeve 30. In another example, the outer sleeve 28 is explosion bonded to the inner sleeve 30. A person of ordinary skill in the art having the benefit of this disclosure would be able to bond the outer sleeve 28 relative to the inner sleeve 30 utilizing any known process.

Figure 3:
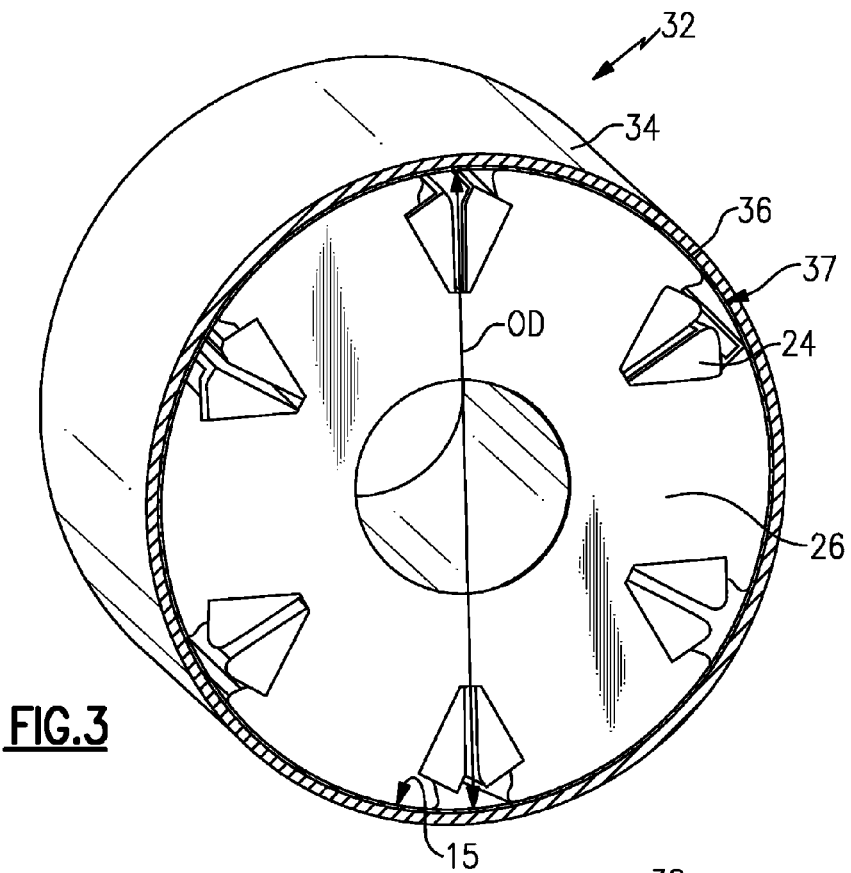
FIG. 3 illustrates another example rotor assembly for the electromechanical machine illustrated in FIG. 1.

FIG. 3 illustrates another example rotor assembly 32 for use within the electromechanical machine 10. In the illustrated example, the rotor assembly 32 includes an outer sleeve 34 and an inner sleeve 36. The inner sleeve 36 is positioned between the rotor core 26 and the outer sleeve 34. That is, the outer sleeve 34 is radially outward relative to the inner sleeve 36.

The rotor core 26 of the rotor assembly 32 defines an outer diameter OD. A radial surface 15 extends about the outer diameter OD. The inner sleeve 36 and the outer sleeve 34 each surround the radial surface 15. That is, outer sleeve 34 and the inner sleeve 36 extend radially about the outer diameter OD off the rotor core 26.

In one example, the outer sleeve 34 is an outer structural sleeve and is made of a composite material. In another example, the outer sleeve 34 is a metallic sleeve. The outer sleeve 34 structurally supports the rotor assembly 32 and, in conjunction with end structures (not shown), contains a fluid, such as oil, within the rotor assembly 32.

In this example, the inner sleeve 36 represents a damper circuit 37 of the rotor assembly 32. The inner sleeve 36 is an outer continuous conducting damper sleeve, for example. The inner sleeve 36 is made of a copper material, in one example. The inner sleeve 36 dampens the electromagnetic flux generated by the rotor assembly 32.

Figure 4:
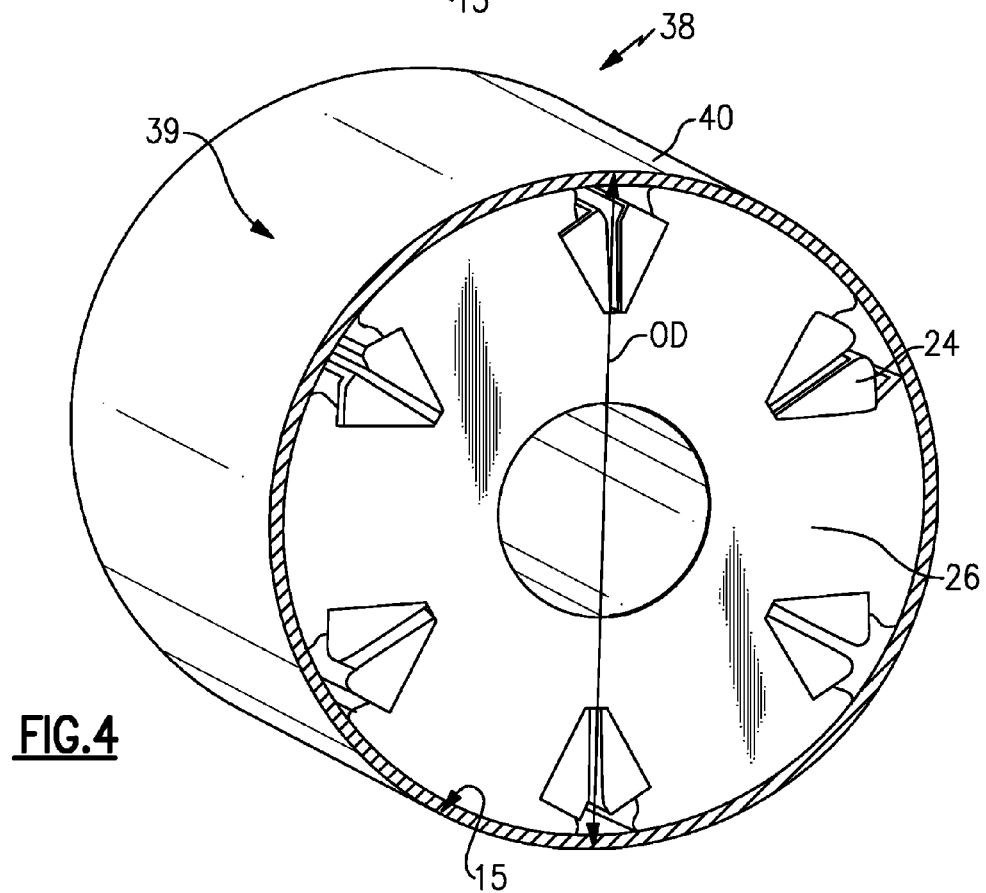
FIG. 4 illustrates yet another example rotor assembly of the electromechanical machine illustrated in FIG. 1.

FIG. 4 illustrates yet another example rotor assembly 38 for use within the electromechanical machine 10. The example rotor assembly 38 includes a single sleeve 40 that radially extends about an outer diameter OD of the rotor core 26 of the rotor assembly 38. That is, the sleeve 40 is a continuous sleeve that surrounds a radial surface 15 of the rotor core 26. The sleeve 40 of the rotor assembly 38 functions as both a structural sleeve and a damper circuit 39 of the rotor assembly 38, in this example.

In one example, the sleeve 40 is a composite sleeve. The sleeve 40 is made of carbon fibers, copper fibers, and an epoxy resin. The carbon fibers and the copper fibers are intertwined to form a single piece composite sleeve 40, in this example. That is, the carbon fibers and the copper fiber are twisted relative to one another to form the composite sleeve 40. The epoxy resin is utilized to bond the carbon fibers and the copper fibers. The sleeve 40 dampens the electromagnetic flux generated by the rotor assembly 38, and structurally supports the rotor assembly 38. A person of ordinary skill in the art having the benefit of this disclosure would be able to select appropriate carbon fibers, copper fibers and epoxy resins for forming a composite sleeve capable of both damping electromagnetic flux and structurally supporting the rotor assembly 38.

The foregoing description shall be interpreted as illustrative and not in any limiting sense. A worker of ordinary skill in the art having the benefit of this disclosure would understand that certain modifications would come within the scope of the disclosure. For these reasons, the following claims should be studied to determine the true scope of the content of the disclosure.

What is claimed is:

1. A rotor assembly for an electromechanical machine, comprising:
    a rotor core having an outer diameter;
    an outer sleeve positioned about said outer diameter of said rotor core; and
    an inner sleeve positioned between said rotor core and said outer sleeve, wherein said outer sleeve dampens electromagnetic flux generated by the rotor assembly.

2. The assembly as recited in claim 1, comprising a plurality of poles and a plurality of field windings wrapped about said plurality of poles.

3. The assembly as recited in claim 1, wherein a radial surface of said rotor core extends about said outer diameter.

4. The assembly as recited in claim 1, wherein said outer sleeve is a copper sleeve and said inner sleeve is a metallic sleeve.

5. The assembly as recited in claim 1, wherein said outer sleeve is a composite sleeve.

6. The assembly as recited in claim 1, wherein the electromagnetic machine is a starter-generator system.

7. The assembly as recited in claim 1, wherein said outer sleeve is an outer continuous conducting damper sleeve that surrounds a radial surface of said rotor core, and said inner sleeve is a structural sleeve that surrounds said radial surface of said rotor core.

8. The assembly as recited in claim 1, comprising a stator assembly positioned radially outward relative to the rotor assembly.

9. A method of providing a rotor assembly having a damper circuit and a rotor core for an electromagnetic machine, comprising the step of:
    a) extending the damper circuit about a radial outermost surface of the rotor assembly.

10. The method as recited in claim 9, wherein the damper circuit includes an outer continuous conducting sleeve that surrounds said a radial outermost surface of the rotor assembly.

11. The method as recited in claim 10, wherein the outer continuous conducting sleeve is a composite sleeve that includes carbon fibers, copper fibers and an epoxy resin.

12. The method as recited in claim 10, wherein the outer continuous conducting sleeve is made of copper.

13. The method as recited in claim 9, comprising the step of:
    b) damping an electromagnetic flux generated by the rotor assembly with the damper circuit.

14. The method as recited in claim 9, wherein the rotor assembly includes a structural sleeve and said step a) includes the step of:
    positioning the damper circuit radially outward relative to the structural sleeve.

15. The method as recited in claim 9, wherein the electromagnetic machine is a starter-generator system and comprising the steps of:
    b) positioning the rotor assembly within the starter-generator system; and
    c) positioning a stator assembly radially outward relative to the rotor assembly.

16. A rotor assembly for an electromagnetic machine, comprising:
    a rotor core having an outer diameter; and a composite sleeve positioned about said outer diameter, wherein said composite sleeve includes carbon fibers, copper fibers and an epoxy resin.

17. The assembly as recited in claim 16, wherein said copper fibers and said carbon fibers form a single piece composite sleeve, and said epoxy resin bonds said copper fibers to said carbon fibers.

18. The assembly as recited in claim 16, wherein said composite sleeve is a combined structural sleeve and an outer continuous conducting damper sleeve that surrounds a radial surface of said rotor core.

19. An electromechanical machine, comprising:
a stator assembly;
a rotor assembly; and
a damper circuit positioned between said stator assembly and said rotor assembly, wherein said damper circuit extends about an entire radially outermost surface of said rotor assembly.

20. The electromechanical machine as recited in claim 19, wherein said damper circuit is a copper sleeve.

* * * * *